No. 735,976. PATENTED AUG. 11, 1903.
W. C. HIERING.
WINDOW SCREEN.
APPLICATION FILED MAY 4, 1903.
NO MODEL. 3 SHEETS—SHEET 2.
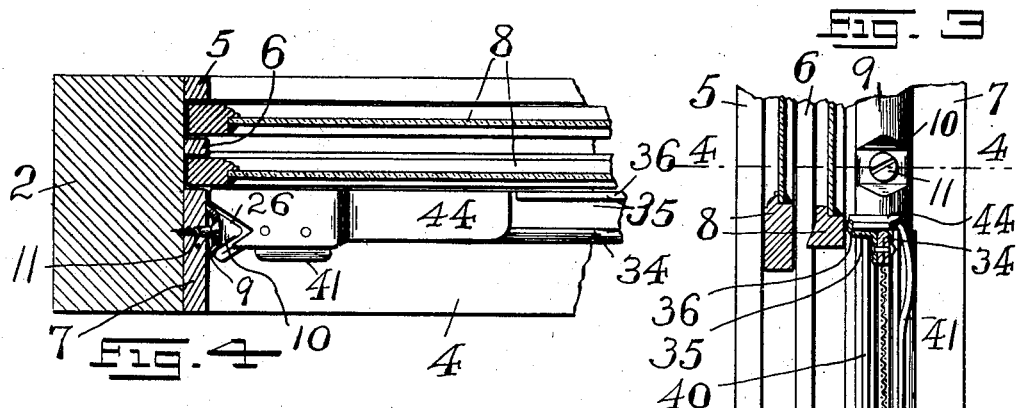
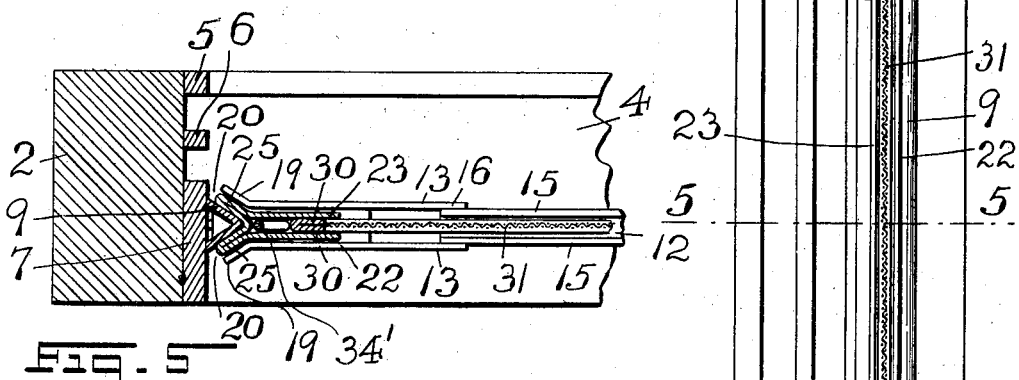
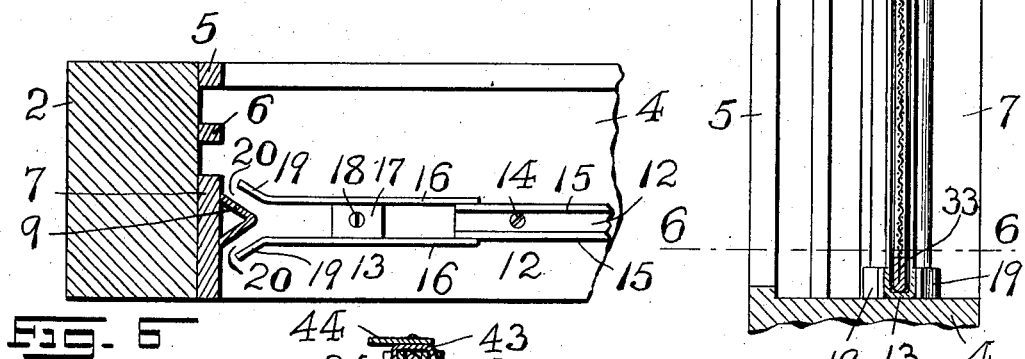
WITNESSES:
Geo. D. Richards
N. B. Fraentzel
INVENTOR:
William C. Hiering,
BY Fred'k C. Fraentzel
ATTORNEY

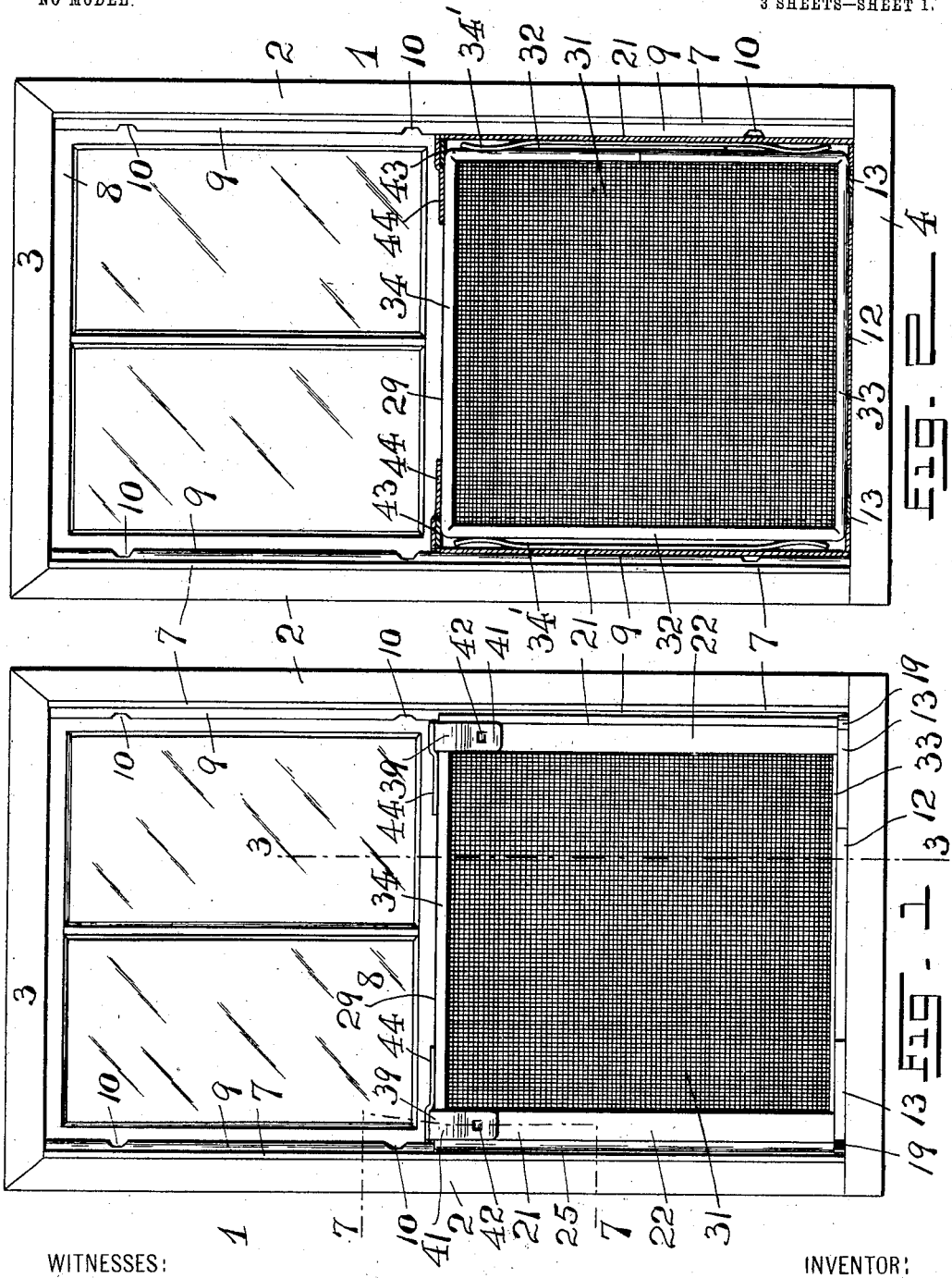

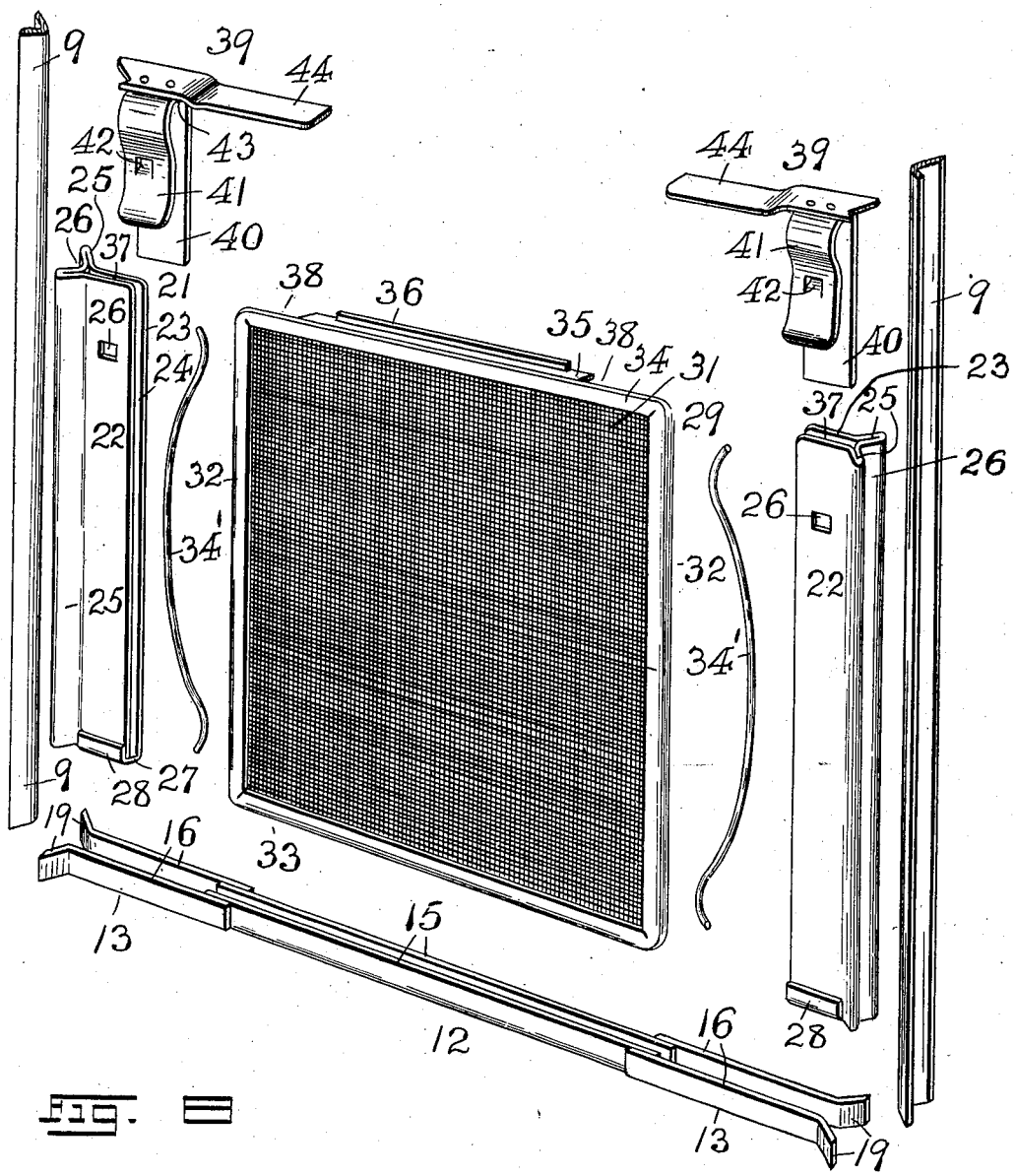

No. 735,976.

Patented August 11, 1903.

UNITED STATES PATENT OFFICE.

WILLIAM C. HIERING, OF NEWARK, NEW JERSEY.

WINDOW-SCREEN.

SPECIFICATION forming part of Letters Patent No. 735,976, dated August 11, 1903.

Application filed May 4, 1903. Serial No. 155,545. (No model.)

*To all whom it may concern:*

Be it known that I, WILLIAM C. HIERING, a citizen of the United States, residing at Newark, in the county of Essex and State of New Jersey, have invented certain new and useful Improvements in Window-Screens; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference to improvements in window-screens; and the invention has for its principal object to provide a novel and simply-constructed screen for windows the parts of which are preferably made of metal and the screen proper being adjustably held between a pair of side guides or retaining devices, whereby the same screen, having a latitude of lateral movement between the said devices, can be arranged in the window-frames in its operative position without having to fit the frame of the screen exactly, so as to be operatively held in its sliding relation upon the guide-rails.

Other objects of the present invention are simplicity and cheapness of construction of the screen-frame and its parts.

My present invention consists in the novel construction of window-screen hereinafter more fully set forth; and, furthermore, this invention consists in the general arrangements and combinations of devices and their parts, as well as in the details of the construction thereof, all of which will be fully described in the following specification and then finally embodied in the clauses of the claim.

The invention is clearly illustrated in the accompanying drawings, in which—

Figure 1 is a front or face view of my novel form of window-screen in position in the side guides or rails of a window-frame, all made of metal and embodying the principles of my invention. Fig. 2 is a similar view of the screen proper, the window-frame, and the side guides or rails secured to said window-frame, but certain holding or retaining devices or members which are slidably arranged on said side guides or rails and for the purpose of retaining the screen in its operative position being represented in vertical section. Fig. 3 is a transverse vertical section, in detail and on an enlarged scale, of the various parts, the said section being taken on line 3 3 in said Fig. 1. Fig. 4 is a horizontal section taken on line 4 4 in said Fig. 3 looking in a downward direction. Fig. 5 is a horizontal section taken on line 5 5 in said Fig. 3; and Fig. 6 is a horizontal section taken on line 6 6 in said Fig. 3, but the screen being removed. Fig. 7 is a detail vertical section taken on line 7 7 in said Fig. 1; and Fig. 8 is a collective perspective view of all the devices and parts of the window-screen embodying the principles of this invention, the various parts being represented in their detached relations to one another.

Similar characters of reference are employed in all of the said hereinabove-described views to indicate corresponding parts.

Referring now to the several figures of the drawings, the reference character 1 indicates the usual construction of window-frame, which comprises the side pieces or stiles 2, the top 3, the sill 4, and 5, 6, and 7 are the usual stop-beads which are employed with and are attached to the said side pieces or stiles 2. Slidably arranged between these stop-beads are the usual window-sashes 8.

The various parts of the window-screen are represented in detail in Fig. 8 of the drawings, and consist, essentially, of a pair of metal side rails 9, which are preferably of a V-shaped cross-section and are formed with suitably disposed and perforated depressions 10 for the reception of screws 11 or other suitable fastening devices by means of which the said rails 9 are secured in their positions upon the faces of the inner stop-beads 7, as clearly illustrated. The said rails 9, as will be seen from an inspection of Figs. 1 and 2, extend from the sill 4 to the top 3. Suitably secured upon the sill 4 is a guide or closing device, the same preferably comprising a center member 12 and a pair of similarly-constructed end members 13. The central member 12, which consists of a channel-shaped piece of metal, is secured in its position upon the sill 4 by means of screws 14 or other fastening means and has the ends of its side members 15 extending between a pair of side pieces 16 of the said end members 13, as illustrated. The side pieces 16 are connected by means of a part 17, having a perforation for the reception of a screw 18 or other means for securing the end member 13 in its operative position upon the sill 4. It will thus be evident that these members 12 and 13 can be adjustably arranged or secured upon the sill 4 and fitted between the stiles or side pieces 2 without having to cut or fit the members to the exact distance between the said side pieces 2. Each side piece 16 of the end members 13 is also made with the angularly-bent ends 19, which are arranged on the opposite sides of the lower ends of the rails 9 in the manner illustrated in Fig. 6 of the drawings, whereby spaces 20 are provided, substantially as shown and for the purposes to be presently described. Slidably arranged upon each rail 9 is a holding or retaining device 21. These devices 21 are also made of sheet metal, being bent to provide a pair of side flanges 22 and 23, having a receiving-space 24 between them and being doubled upon each other, as at 25, whereby a V-shaped or other suitably-shaped channel 26 is provided, which may be fitted upon the guide-rails 9, as indicated in Fig. 5 of the drawings. One of the said side flanges, as 22, is provided with an opening 26, and the other side flange 23 is provided with a lip 27 at its lower end, as illustrated in Fig. 8, the said lip being bent, as at 28, about the lower edge of the side flange 22, whereby a rest is provided for retaining the screen proper between said flanges 22 and 23 during the raising and lowering operations.

Coming now to the screen proper, the same consists, essentially, of a sheet-metal frame 29, preferably made in one continuous piece and comprising the doubled-over parts 30, (see Figs. 3 and 5,) between which the screen 31 is suitably held. The frame 29 and its screen 31 are arranged with the opposite side members 32 of the frame 29 movable as well as removable in the receiving-spaces 24 between the side frames 22 and 23 of the retaining devices 21, the corner portions of the lower member 33 of the frame 29 being placed directly upon the rests 27 of the said devices 21. Suitably-constructed springs, as 34', are placed in the said spaces 24 between the said side flanges 22 and 23, said springs bearing against the edges of the opposite side members 32 of the frame 29 in the manner represented more particularly in Fig. 2 of the drawings to retain this frame 29 and its screen operatively between the oppositely-placed devices 21, which in turn are slidably held upon the rails 9. That there may be no open space between the upper member 34 of the frame 29 and the frame-pieces of the window-sash when in its fully raised or lowered positions the said member 34 is preferably made with an angular strip 35, having a shoulder 36, which is fitted closely against the frame-piece of the window-sash, as illustrated in Fig. 3.

According to the widths of the side flanges 22 and 23 of the devices 21 the same size frame 29 and screen 31 can be used with windows of varying widths, the members 12 and 13 being adjusted accordingly and the springs 34' properly retaining the frame 29 and its screen 31 in their operative position. It will also be evident that when the frame and screen are in their closed or lowered position in the window-frame the lower member 33 of the frame 29 is fitted between the side pieces 15 and 16 of the respective members 12 and 13 and the lower ends of the bent parts 25 of the devices 21 rest directly in the spaces 20 between the rails 9 and the angular end portions 19 of the members 13, whereby a complete closure is produced to prevent flies and other insects from entering the room at this point. The upper open spaces 37 between the side flanges 22 and 23 and the open spaces 38 at or near the upper corner portions of the frame 29 are closed by clamping devices 39. (Represented in the various figures of the drawings.) These clamping devices 39 also act to retain the frame 29 and screen in position between the retaining devices 21 against upward displacement from said devices 21 when raising or lifting the said frame 29 and its screen 31. Each device 39 comprises a back plate 40 and a suitably-bent front plate 41, said plate 41 being made with a holding tongue or lug 42, extending in an inward direction toward the back plate 40. Suitably secured upon the upper connecting portion 43 between the said plates 40 and 41 is a laterally-extending plate 44. When the said frame 29 and screen 31 have been arranged between the devices 21 in the manner hereinabove described, then the devices 39 are slipped over the open portions 37 and the plates 40 and 41 respectively brought against the outer surfaces of the side flanges 23 and 22 until the tongue or lug 42 registers with the opening 26 in the flange 22 and by engaging with one of the surrounding edges of said opening holds the device 39 in its place, with the laterally-extending plate 44 arranged directly above the open part 38, as clearly indicated in the several figures of the drawings, and thereby providing a tight closure against the entrance of insects between the window-sash and the upper part of the frame 29.

The manner of assembling the various parts will be clearly understood from the above description and will be readily seen from an inspection of said Fig. 8.

The arrangement and construction of the various parts are such that they can be used with window-frames which vary in width or which are out of "true," the parts being easily arranged in position without having to be exactly fitted in place, and, furthermore, all the parts being made of metal when once assembled in their operative positions in the window-frame they will always slide upon the rails and will not stick in damp weather or when the parts become wet, as is the case with the ordinary frames of wood which are made to slide upon rails or guides of wood.

The arrangement and construction of the devices 21 upon the rails 9 are such that the parts will slide upon each other with but very little friction, whereby the frame 29 and its screen 31 can be raised and lowered with ease.

I am aware that various changes may be made in the arrangements and combinations of the devices and their parts, as well as in the details of the construction thereof, without departing from the scope of my present invention. Hence I do not limit this invention to the exact arrangements and combinations of the devices and their parts as described in the foregoing specification and as illustrated in the accompanying drawings, nor do I confine myself to the exact details of the construction of the said parts.

Having thus described my invention, what I claim is—

1. In a window-screen, the combination, with a pair of metal guide-rails, of a metal frame and screen slidably arranged upon said rails, and a closing device adapted to be arranged upon the sill of the window-frame, said closing device having upwardly-extending side members between which the lower portion of said frame is arranged, substantially as and for the purposes set forth.

2. In a window-screen, the combination, with a pair of metal guide-rails, of a metal frame and screen slidably arranged upon said rails, and a closing device adapted to be arranged upon the sill of the window-frame, comprising a central member and adjustable end members, said central member and said end members having upwardly-extending side pieces between which the lower portion of said frame is arranged, substantially as and for the purposes set forth.

3. In a window-screen, the combination, with a pair of guide-rails, of a retaining member slidably arranged upon each guide-rail, each retaining member having a receiving means, a spring in each receiving means, and a frame and screen removably arranged in the receiving means and held therein by said springs, substantially as and for the purposes set forth.

4. In a window-screen, the combination, with a pair of guide-rails, of a retaining member slidably arranged upon each guide-rail, a pair of side flanges connected with each retaining member forming a receiving-space between them, a frame and screen, said frame having its side members movably arranged in the said receiving-spaces, and a spring 34' between each pair of side flanges in engagement with the side members of said frame, substantially as and for the purposes set forth.

5. In a window-screen, the combination, with a pair of guide-rails, of a retaining member slidably arranged upon each guide-rail, a pair of side flanges connected with each retaining member forming a receiving-space between them, a rest connected with the lower part of each pair of side flanges, and a frame and screen, said frame having its side members movably arranged in the said receiving-spaces, substantially as and for the purposes set forth.

6. In a window-screen, the combination, with a pair of guide-rails, of a retaining member slidably arranged upon each guide-rail, a pair of side flanges connected with each retaining member forming a receiving-space between them, a rest connected with the lower part of each pair of side flanges, a frame and screen, said frame having its side members movably arranged in the said receiving-spaces, and a spring 34' between each pair of side flanges in engagement with the side members of said frame, substantially as and for the purposes set forth.

7. In a window-screen, the combination, with a pair of guide-rails, of a retaining member slidably arranged upon each guide-rail, a pair of side flanges connected with each retaining member forming a receiving-space between them, a frame and screen, said frame having its side members movably arranged in the said receiving-spaces, and a clamping device connected with the upper part of each pair of side flanges provided with means in holding engagement with the upper portion of said frame, substantially as and for the purposes set forth.

8. In a window-screen, the combination, with a pair of guide-rails, of a retaining member slidably arranged upon each guide-rail, a pair of side flanges connected with each retaining member forming a receiving-space between them, a frame and screen, said frame having its side members movably arranged in the said receiving-spaces, a clamping device connected with the upper part of each pair of side flanges provided with means in holding engagement with the upper portion of said frame, and a spring 34' between each pair of side flanges in engagement with the side members of said frame, substantially as and for the purposes set forth.

9. In a window-screen, the combination, with a pair of guide-rails, of a retaining member slidably arranged upon each guide-rail, a pair of side flanges connected with each retaining member forming a receiving-space between them, one of the said side flanges being provided with an opening 26, a frame and screen, said frame having its side members movably arranged in the said receiving-spaces, and a clamping device connected with the upper part of each pair of side flanges, consisting, essentially, of a back plate 40 and a front plate 41, and a holding-tongue on said front plate in engagement with the surrounding edge of the opening 26, substantially as and for the purposes set forth.

10. In a window-screen, the combination, with a pair of guide-rails, of a retaining member slidably arranged upon each guide-rail, a pair of side flanges connected with each retaining member forming a receiving-space between them, one of the said side flanges being provided with an opening 26, a frame and screen, said frame having its side members movably arranged in the said receiving-spaces, and a clamping device connected with the upper part of each pair of side flanges, consisting, essentially, of a back plate 40, and a front plate 41, a holding-tongue on said front plate in engagement with the surrounding edge of the opening 26, and a laterally-extending plate 44 arranged directly above the upper edge of the frame, substantially as and for the purposes set forth.

11. In a window-screen, the combination, with a pair of guide-rails, of a retaining member slidably arranged upon each guide-rail, a pair of side flanges connected with each retaining member forming a receiving-space between them, one of the said side flanges being provided with an opening 26, a frame and screen, said frame having its side members movably arranged in the said receiving-spaces, a clamping device connected with the upper part of each pair of side flanges, consisting, essentially, of a back plate 40, and a front plate 41, a holding-tongue on said front plate in engagement with the surrounding edge of the opening 26, and a laterally-extending plate 44 arranged directly above the upper edge of the frame, and a spring 34' between each pair of side flanges in engagement with the side members of said frame, substantially as and for the purposes set forth.

12. In a window-screen, the combination, with a frame and screen, of a V-shaped guide-rail, and a retaining device slidably arranged on said rail, made of sheet metal and comprising a pair of side flanges 22 and 23, doubled-over portions 25 connected with said flanges, and a V-shaped channel 26 between said doubled-over portions 25, substantially as and for the purposes set forth.

13. In a window-screen, the combination, with a frame and screen, of a V-shaped guide-rail, and a retaining device slidably arranged on said rail, made of sheet metal and comprising a pair of side flanges 22 and 23, doubled-over portions 25 connected with said flanges, a V-shaped channel 26 between said doubled-over portions 25, and a lip on one of said side flanges having a part bent over the edge of the other side flange, said lip forming a rest, substantially as and for the purposes set forth.

In testimony that I claim the invention set forth above I have hereunto set my hand this 30th day of April, 1903.

WILLIAM C. HIERING.

Witnesses:
FREDK. C. FRAENTZEL,
GEO. D. RICHARDS.